US007580381B2

(12) United States Patent
Michelon et al.

(10) Patent No.: US 7,580,381 B2
(45) Date of Patent: Aug. 25, 2009

(54) DETERMINATION OF THE POSITIONS OF MOBILE COMMUNICATION TERMINALS WITH THE AID OF NAVIGATION DATA OF VARIOUS ORIGINS

(75) Inventors: Julien Michelon, Toulouse (FR); Didier Flament, Quint-Fonsegrives (FR)

(73) Assignee: Alcatel-Lucent, Paris (FR)

( * ) Notice: Subject to any disclaimer, the term of this patent is extended or adjusted under 35 U.S.C. 154(b) by 766 days.

(21) Appl. No.: 10/547,788

(22) PCT Filed: Mar. 4, 2004

(86) PCT No.: PCT/FR2004/000515

§ 371 (c)(1),
(2), (4) Date: Oct. 18, 2005

(87) PCT Pub. No.: WO2004/082316

PCT Pub. Date: Sep. 23, 2004

(65) Prior Publication Data

US 2006/0276198 A1   Dec. 7, 2006

(30) Foreign Application Priority Data

Mar. 7, 2003 (FR) .................................. 03 02830

(51) Int. Cl.
*H04B 7/00* (2006.01)

(52) U.S. Cl. .................... 370/310; 370/270; 370/315; 370/467; 370/490; 370/492; 455/456.1

(58) Field of Classification Search ................ 370/310, 370/230, 255, 270, 312, 315, 316, 319, 320, 370/335, 466, 467, 485, 490, 492, 503, 509; 455/456.1, 456.3, 456.6; 701/1, 207–215
See application file for complete search history.

(56) References Cited

U.S. PATENT DOCUMENTS 6,449,486 B1   9/2002   Rao 6,775,251 B1 *   8/2004   Wiedeman et al. .......... 370/316
2002/0154605 A1 *  10/2002   Preston et al. .............. 370/254
2004/0029545 A1 *   2/2004   Anderson et al. ........ 455/151.2

FOREIGN PATENT DOCUMENTS

WO   WO 01/95642 A   12/2001
WO   WO 02/23215 A    3/2002

OTHER PUBLICATIONS

Y. Cui et al, "Autonomous vehicle positioning with GPS in urban canyon environments", May 21, 2001, Proceedings of the 2001 IEEE International Conference on Robotics and Automation, ICRA 2001, Seoul, Korea, May 21-26, 2001, Proceedings of the IEEE International Conference on Robotics and Automation, New York, NY, IEEE, US vol. 1 of 4, XP010550297.

* cited by examiner

*Primary Examiner*—Matthew D Anderson
*Assistant Examiner*—Shaima Q Aminzay
(74) *Attorney, Agent, or Firm*—Fay Sharpe LLP

(57) ABSTRACT

A telecommunications system comprises a terrestrial repeater (TR) telecommunication network, a satellite positioning network (CS) which delivers signals containing navigation data, and mobile communication terminals (UE) comprising reception and calculation means (DPS) which can determine the respective positions thereof from said signals, and the navigation data that they contain, in addition to communication means (RH) which can receive communication data frames from the telecommunication network. The communication network integrates additional navigation data in chose locations of some of the data frames in order to create increased data frames. The mobile terminals (UE) also comprises extraction means (ME) which are used to extract additional navigation data contained in the increased data frames received by the communication means (RH) and to send them to the reception and calculation means (DPS) so that they can determine the positions of the associated terminals (UE) from the navigation data and additional navigation data.

49 Claims, 2 Drawing Sheets

DETERMINATION OF THE POSITIONS OF MOBILE COMMUNICATION TERMINALS WITH THE AID OF NAVIGATION DATA OF VARIOUS ORIGINS

BACKGROUND

The invention concerns the field of determining the positions of mobile communication terminals within telecommunication installations.

In the present context the expression "telecommunication installation" means an installation including in particular at least one broadcast network, for example radio (and in particular digital radio), satellite or wide-band multimedia broadcast network, and/or a mobile telephone network. Furthermore, as used hereinafter, the expression "telecommunication network" means any type of network, of a telecommunication installation of the invention, capable of transmitting by means of waves (frames of) communication data, of whatever form.

The person skilled in the art knows that more and more mobile communication terminals are equipped with applications relying at least in part on the determination of their respective positions. Furthermore, more and more services offered by mobile telecommunication network operators to their customers possessing mobile terminals rely at least in part on knowing the positions of their mobile terminals.

Positions may be determined by two different techniques. A first technique consists in determining the position of the mobile signal by processing signals (multiple access phase-modulated CDMA or FDMA signals), and navigation data that they contain, supplied by at least four different satellites of a Global Navigation Satellite System (GNSS) type positioning network, such as the GPS network, for example, the GLONASS network, or the future GALILEO network. This first technique requires the mobile terminal whose position is to be determined to be fitted with a satellite positioning device.

The second technique consists in estimating the position of a mobile terminal in the base station systems (BSS) that certain cellular mobile telecommunication systems include, such as GSM/GPRS and UMTS networks. Simplifying, this estimation necessitates an exchange of paging messages between the mobile terminal and the BSS to enable determination of the cell in which the mobile terminal is situated, followed by determining its location within the cell by an analysis of the message propagation time.

The first technique offers a positioning accuracy of the order of around 50 to around 100 meters, which is incompatible with certain applications or certain services linked to the immediate environment of the mobile terminals. Moreover, this first method can be used only if the mobile terminal can simultaneously receive signals and acquire navigation data from at least four satellites. This condition is frequently not met, in particular in certain urban environments (known as "urban canyons") and irregular environments such as mountainous areas, areas with a high density of tall buildings, tunnels, and indoor locations.

The second technique offers a positioning accuracy of the order of a few hundred to a few thousand meters, depending on the dimensions of the cells of the telecommunication network. It is therefore also incompatible with certain applications or certain services linked to the immediate environment of the mobile terminals.

In an attempt to improve on this situation, it has been proposed to combine the first method with another method, such as an inertial method, for example, or to combine navigation data from different positioning networks (including the LORAN C network). However, these combinations are costly and/or offer unsatisfactory positioning accuracy and/or cannot be used in urban canyon type environments and/or cannot function continuously and autonomously over large areas.

SUMMARY

As none of the prior art solutions is entirely satisfactory, an object of the invention is to improve upon the situation.

To this it end it proposes a mobile communication terminal for a telecommunication installation comprising at least one telecommunication network with terrestrial repeaters and at least one satellite positioning network that delivers signals containing navigation data, said mobile communication terminal comprising reception and calculation means that determine its position from said signals and navigation data and communication means that receive communication data frames from said telecommunication network.

This mobile communication terminal is characterized in that said receiving means receive from said telecommunication network frames known as augmented frames including complementary navigation data and communication data and in that it comprises extraction means that extract complementary navigation data from augmented frames received by its communication means and send them to said reception and calculation means in order for them to determine said position from said navigation data and said complementary navigation data received and extracted.

As a result, if a terminal is not able to receive simultaneously signals containing navigation data from at least four satellites of the positioning network, it can receive from the telecommunication network to which it is attached complementary navigation data that will enable it to determine its position, where applicable with improved accuracy.

The mobile terminal of the invention may have other features, and in particular, separately or in combination:

- extraction means that extract from the received augmented frames complementary navigation data in the form of first navigation messages, for example of the Satellite based Augmentation System (SBAS) type,
- extraction means (ME) that extract complementary navigation data in the form of second navigation messages from the received augmented frames, for example from the repeaters of the telecommunication network,
- extraction means that extract complementary navigation data in the form of first and second navigation messages from the received augmented frames,
- communication means and extraction means that receive and process augmented frames sent in the form of signals frequency-modulated by the OFDM technique. In this case, at least the second navigation messages are integrated into a cyclic frame preamble after conversion of the frequency of the communication data,
- communication means and extraction means that receive and process augmented frames sent in the form of multiple access phase-modulated signals, for example by the W-CDMA technique. In this case, the communication means and the extraction means may receive and process augmented frames sent after encoding the first and/or second navigation messages using a selected sequence of orthogonal pseudo-random codes,
- communication means and extraction means that receive and process augmented frames including identification data for distinguishing the terrestrial repeaters from each other. In this case, the identification data may consist of the pseudo-random codes used in a sequence, reception and calculation means comprising signal reception means and calculation means that conjointly determine pseudo-distances from the signals received and navigation data that they contain, and communication means and extraction means that conjointly determine pseudo-distances from the received augmented frames and navigation data contained in the second messages that they contain, these pseudo-distances and those determined by the reception means and the calculation means being then sent to the reception and calculation means for them to determine the positions, reception and calculation means that comprise correction means coupled to the extraction means that determine from received first navigation messages corrections to be applied to navigation data received from the positioning network before proceeding to determine the positions.

The invention also relates to a terrestrial repeater for a telecommunication network of a telecommunication installation also comprising at least one satellite positioning network that delivers signals containing navigation data, said telecommunication network comprising mobile communication terminals of the above type.

The terrestrial repeater is characterized in that it comprises integration means adapted to integrate complementary navigation data at selected locations in at least some of the communication data frames from the telecommunication network, to constitute augmented frames, and send/receive means adapted to transmit the augmented frames to the mobile terminals.

The terrestrial repeater of the invention may have other features, and in particular, separately or in combination:

send/receive means that receive from the telecommunication network augmented frames including complementary navigation data in the form of first navigation messages, for example of the SBAS type, and forward the received augmented frames to the communication terminals, integration means that constitute augmented frames by integrating second navigation messages including complementary navigation data, integration means that integrate second navigation messages into augmented frames received from the telecommunication network and already containing first navigation messages, integration means that constitute the augmented frames in the form of signals frequency-modulated by the OFDM technique. In this case, the integration means preferably integrate (at least) the second navigation messages into a cyclic frame preamble after conversion of the frequency of the communication data. This means that frequency synchronization may be effected with the extraction means of the mobile terminals. Alternatively, the integration means may be configured to constitute the augmented frames in the form of multiple access phase-modulated signals, for example by the W-CDMA technique. In this case, the integration means may be configured to constitute the augmented frames after encoding of the first and/or second navigation messages with the aid of a selected sequence of orthogonal pseudo-random codes, enabling the mobile terminal to distinguish the terrestrial repeaters by a correlation process similar to that effected in the GPS terminals, integration means that integrate identification data for distinguishing between the terrestrial repeaters into the augmented frames.

The invention further relates to a stream server for a telecommunication network with terrestrial repeaters (RT) of the type described above.

The stream server of the invention is characterized in that it is supplied with communication data by a communication server and with complementary navigation data, relating to the positioning network, by a navigation server and constitutes from the communication data and the complementary navigation data received augmented frames to be sent at least to the terrestrial repeaters and the mobile terminals of the telecommunication network.

The server preferably constitutes augmented frames including complementary navigation data in the form of first navigation messages, for example of the SBAS type. It may also integrate the same first navigation message into a selected number of successive augmented frames.

The invention further relates to a telecommunication network that comprises at least one terrestrial repeater and at least one stream server of the type described above. A network of this kind may advantageously be selected from terrestrial mobile telephone radio networks, radio broadcast networks, wide-band multimedia data broadcast networks and hybrid broadcast networks. In the present context, the expression "hybrid broadcast network" (or hybrid network) means a satellite telecommunication network comprising a multiplicity of terrestrial repeaters.

The invention further relates to a telecommunication installation that comprises at least one telecommunication network with terrestrial repeaters of the type described above, at least one satellite positioning network that delivers signals containing navigation data, and at least one mobile communication terminal of the type described above.

The invention further relates to a method of determining positions of mobile communication, terminals within a telecommunication installation comprising at least one telecommunication network with terrestrial repeaters that sends communication data frames and at least one satellite positioning network that delivers signals containing navigation data.

The method is characterized in that it consists in, firstly, sending the mobile terminals signals containing navigation data with the aid of the positioning network, secondly, constituting augmented frames by integrating complementary navigation data at selected locations of communication data frames and then sending the augmented frames to the mobile terminals, and, thirdly, determining in the mobile terminals their respective positions from the signals and navigation data which they contain received from the positioning network and the complementary navigation data contained in the augmented frames received from the telecommunication network.

The method of the invention may have other features, and in particular, separately or in combination:

some of the complementary navigation data may come from the positioning network. In this case, the complementary data is integrated into the augmented frames, upstream of the terrestrial repeaters, in the form of first navigation messages, for example of the SBAS type. The integration of the same first navigation message into successive augmented frames may then be repeated a selected number of times, some of the complementary navigation data may be integrated into the augmented frames in the terrestrial repeaters in the form of second navigation messages, some of the complementary navigation data may be integrated in the form of second navigation messages in the terrestrial repeaters into received augmented frames containing first navigation messages, the augmented frames may be sent by the terrestrial repeaters in the form of signals frequency-modulated by the OFDM technique. In this case, at least the second navigation messages are preferably integrated into a cyclic frame preamble after conversion of the frequency of the communication data. Alternatively, the augmented frames may be sent by the terrestrial repeaters in the form of multiple access phase-modulated signals, for example by the W-CDMA technique. The augmented frames may be transmitted after encoding of the first and/or second navigation messages with the aid of a selected sequence of orthogonal pseudo-random codes to enable the mobile terminal to distinguish the repeaters by a correlation process similar to that effected by the GPS terminals, identification data for distinguishing them from each other may be integrated into the augmented frames in the terrestrial repeaters, pseudo-distances may be determined in the mobile terminals firstly from the signals received and navigation data that they contain and secondly from augmented frames received and navigation data contained in the second messages that they contain, these pseudo-distances then being used to determine the positions, corrections to be applied to the navigation data received from the positioning network may be determined in the mobile terminals from the first navigation messages received, before proceeding to determine the positions.

BRIEF DESCRIPTION OF THE DRAWINGS

Other features and advantages of the invention will become apparent on reading the following detailed description and examining the appended drawings, in which.

The appended drawings constitute part of the description of the invention as well as contributing to the definition of the invention, if necessary.

DETAILED DESCRIPTION

The invention relates to determining the position of mobile communication terminals within a telecommunication installation. In the present context, the expression "telecommunication installation" means an installation including at least one mobile telecommunication network with terrestrial repeaters, at least one satellite positioning network, and mobile communication terminals.

Figure 1:
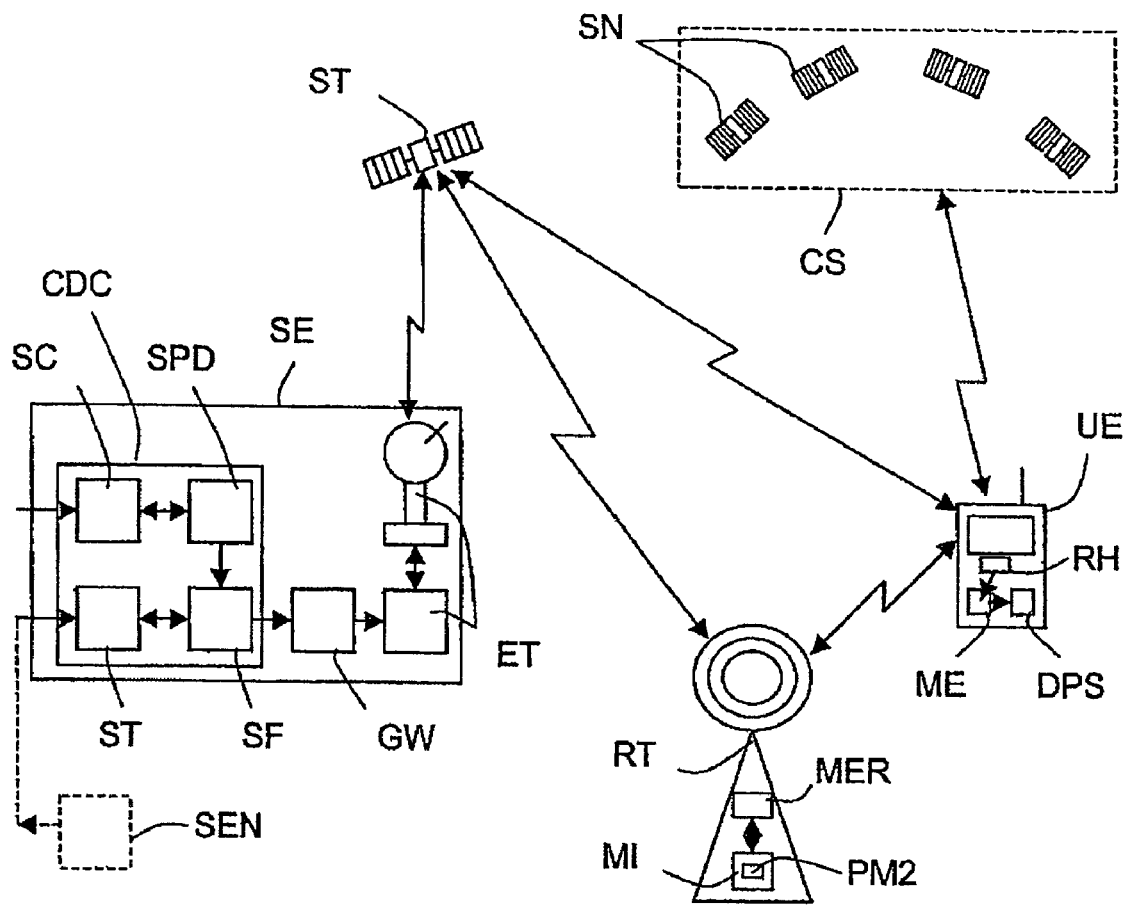
FIG. 1 is a diagram of one embodiment of a telecommunication installation of the invention.

In the example shown in FIG. 1, the installation includes only one mobile telecommunication network, which is of a hybrid type, and one satellite positioning system (represented by its constellation CS of satellites SN). In the present context, the expression "hybrid network" means a satellite telecommunication network including a multiplicity of terrestrial repeaters.

Simplifying, the mobile telecommunication network comprises one or more sender stations SE, one or more telecommunication satellites ST and a multiplicity of terrestrial repeaters RT installed at selected places in the network. Moreover, the satellite positioning system is of the Global Navigation Satellite System (GNSS) type, for example the GPS network. However, it could be any other type of GNSS network, such as the GLONASS network or the future GALILEO network, for example, or a combination of at least two of the three networks cited above. This satellite positioning network may be coupled to a so-called "augmentation" system, such as an SBAS system relying on broadcasting by geosynchronous satellites, for example. However, any other type of augmentation system may be envisaged, either a local system or a system accessible via the Internet.

Of course, the invention is not limited to hybrid satellite telecommunication networks. In particular, it relates equally to radio telecommunication networks, and especially to GSM/GPRS and UMTS cellular networks (and all equivalents thereof), that include a multiplicity of terrestrial repeaters (or base stations) fitted out in accordance with the invention.

In the present context, the expression "mobile communication terminal" (UE) means any type of communication terminal capable of receiving, firstly, communication data, in this case broadcast by a hybrid satellite mobile telecommunication network (directly via one of its telecommunication satellites ST and indirectly via its terrestrial repeaters RT), and, secondly, navigation data from the satellite positioning network CS. These terminals may therefore be mobile telephones, personal digital assistants (PDA), portable computers, dedicated communication devices on board a terrestrial, maritime or airborne vehicle and implementing at least one application linked to positioning.

It is considered hereinafter by way of illustrative example that the mobile communication terminals UE are mobile telephones that can communicate with the mobile telecommunication network (referred to hereinafter as the hybrid network) by means of a hybrid receiver RH and can communicate with the satellite positioning network CS by means of a satellite positioning device DPS, referred to hereinafter as the DPS device, for example of the GPS type.

As already indicated, the device DPS can determine the position of the mobile terminal UE in which it is installed correctly only if it receives signals and navigation data that they contain from at least four satellites SN of the constellation CS of the positioning network. As this condition is frequently not satisfied, and the positioning accuracy is often insufficient in relation to the application that utilizes it, the invention proposes to use the communication "context" provided by the hybrid network to supply the mobile telephone UE with navigation data complementary to that supplied by the constellation CS.

To this end, three different embodiments of the invention are proposed. A first embodiment consists in integrating first navigation messages including complementary navigation data supplied by an augmentation system into communication frames sent by the sender stations SE of the hybrid network to the mobile telephones UE via the telecommunication satellites and the terrestrial repeaters RT. A second embodiment consists in integrating second navigation messages including complementary navigation data into communication frames that are retransmitted by the terrestrial repeaters RT to the mobile telephones UE. A third embodiment consists in a combination of the first and second embodiments.

Because it combines the other two, only the third embodiment is described in detail hereinafter.

As shown in FIG. 1, a sender station SE of a hybrid network of the invention conventionally comprises a content distribution center CDC, also known as a content hub, coupled to a terrestrial sender ET, also known as an up-link earth station, preferably via an access gateway GW.

In the present example, the content distribution center CDC comprises a communication data supply channel and a complementary navigation data supply channel coupled to a stream server SF, also known as a streamer, which is itself coupled to the access gateway GW. Here the communication data supply channel conventionally comprises a content server SC supplied with communication data by various external sources and a broadcast programming server SPD, also known as a broadcast scheduler, supplied by the content server SC and supplying the stream server SF. Here the complementary navigation data supply channel comprises only a processing server ST fed with complementary navigation data by a navigation server SEN of the augmentation system and supplying the stream server SF.

The processing server ST constructs first navigation messages from complementary navigation data that it receives from the navigation server SEN. The processing server ST preferably constructs first navigation messages in the form of satellite based augmentation system (SBAS) type augmented messages. These messages being well known to the person skilled in the art, they are not described in detail. Suffice to say that the SBAS messages contain data for correcting the navigation data supplied by the satellites ST of the constellation CS in order to improve the quality (accuracy, integrity, continuity and availability) of the position determined by a DPS device within a mobile telephone UE. To be more precise, this SBAS data is generally used to correct time synchronization errors between navigation satellites SN and/or ephemerides errors and/or propagation errors. They may also contain information relating to the integrity of the navigation data.

The stream server SF is preferably adapted to place the first navigation messages, here of the SBAS type, and the communication data in communication frames described as augmented. These augmented frames are in fact similar to the communication frames that are transmitted to the telecommunication satellite ST in the absence of SBAS data. In other words, these are standard communication frames that additionally include a first navigation message.

Each time that the sender station SE wishes to send the mobile telephones UE SBAS data relating to the satellite positioning network CS, its processing server ST generates a first navigation message by "encapsulating" the SBAS data according to a selected format (compatible with the configurations of the DPS devices), and then sends it to the stream server SF. Each first navigation message preferably constitutes what the person skilled in the art knows as a navigation overlay frame (NOF). An NOF satisfies versions A, B, C and subsequent versions and revisions of the RTCA DO229 standard, and may vary according to the region (EGNOS/WAAS/MSAS, and the like).

It is important to note that the first navigation message (NOF) is not necessarily synchronized with a chosen time reference. Consequently, if such synchronization proves necessary, the processing server ST can be adapted to append a temporal marker to a first navigation message. In fact, the first navigation messages being integrated into augmented frames which, in the present example, are broadcast by satellite SN, the temporal marker is required only in the presence of broadcasting with weak temporal constraints.

When the stream server SF is in possession of a first encapsulated navigation message and communication data to be broadcast, it generates an augmented frame that it transmits to the terrestrial sender ET via the access gateway GW. The frame is then sent to the telecommunication satellite ST concerned which then forwards it to the mobile telephones UE and the terrestrial repeaters RT of its hybrid network.

To increase the probability that a mobile telephone UE can actually receive the first navigation message contained in a broadcast augmented frame, the stream server SF can be adapted to repeat the integration of this first navigation message into successive augmented frames a selected number of times. In this case, the stream server SF comprises a memory for provisionally storing the first navigation messages so as to be able to integrate them each time that it receives an instruction not to broadcast communication data.

Figure 2:
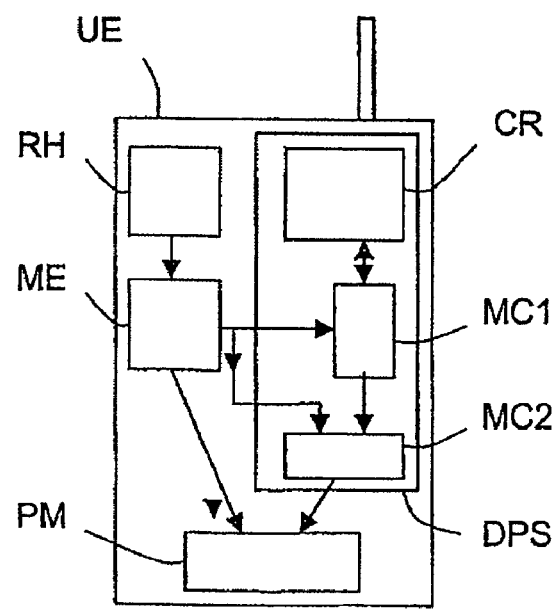
FIG. 2 is a diagram of one embodiment of a mobile communication terminal of the invention.
Figure 3:
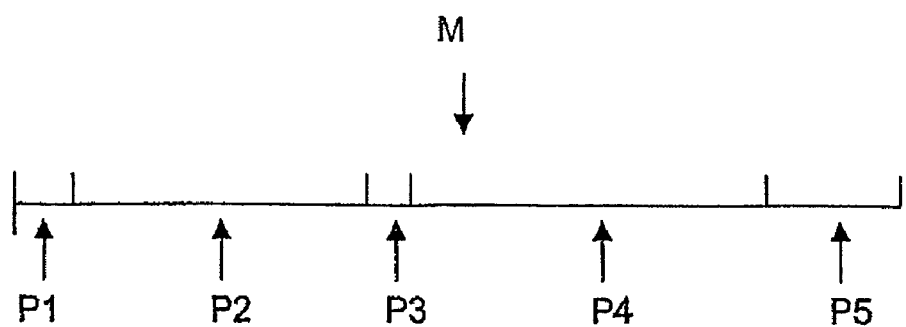
FIG. 3 is a diagram of one example of the arrangement of a navigation message integrated into an augmented frame by a terrestrial receiver.

As shown in FIG. 2, in accordance with the invention, each mobile telephone UE includes a device DPS capable of receiving navigation data transmitted by the constellation CS of satellites SN and a hybrid receiver RH capable of receiving (augmented) communication frames broadcast by the hybrid network (telecommunication satellites ST and terrestrial repeaters RT).

The mobile telephone UE further comprises a complementary navigation data extraction module ME coupled to the hybrid receiver RH and supplying, firstly, the device DPS, and, secondly, the processing module PM of said telephone UE, which in particular manages the applications and services requiring the position measurements.

The extraction module ME discriminates the various types of complementary navigation data contained in the augmented frames received from the hybrid network. As indicated above, the hybrid network broadcasts augmented frames containing first navigation messages via its telecommunication satellites ST and its terrestrial repeaters RT. However, the terrestrial repeaters RT may be adapted to insert second navigation messages containing navigation data from which pseudo-distances (also known as "pseudoranges") can be determined (see below) into communication frames, in particular those received from a telecommunication satellite ST of its hybrid network.

These terrestrial repeaters RT being advantageously placed at known fixed locations, they may be used as pseudo-satellites (also known as "pseudolites"), which are well known to the person skilled in the art.

To this end, the terrestrial repeaters RT include in addition to their usual components, and in particular their send/receive module MER, an integration module MI for integrating second navigation messages into the communication frames to be transmitted to the mobile telephones UE. Of course, if the terrestrial repeater RT must forward an augmented frame already including a first navigation message, its integration module MI integrates the second navigation message into the augmented frame.

The integration module MI may also be adapted to repeat the same first message in successive communication frames (augmented or otherwise).

The terrestrial repeaters RT are preferably synchronized with their hybrid network relative to a temporal reference provided by the satellite positioning network CS, as much for navigation data as for communication data. This synchronization, the accuracy of which is typically of the order of 10 ns (to within the standard deviation), may be effected to a standardized local frequency thanks to the local oscillators of the terrestrial repeaters RT.

On receiving augmented frames containing a second message, the hybrid receiver RH and the extraction module ME determine pseudo-distances (also known as "pseudoranges"). To be more precise, the hybrid receiver RH first determines the propagation time of the augmented communication frame between the terrestrial repeater RT and the hybrid receiver RH by (auto-)correlating the received message with a predictive replica of the expected message.

When the pseudo-distances have been determined and the navigation data extracted from a second message contained in a received augmented frame, the extraction module ME communicates them to the device DPS (see below). The communication data that accompanies these navigation messages is transmitted to the processing module PM of the mobile telephone UE.

The device DPS has the standard structure of a positioning device capable of correcting navigation data using SBAS correction data, for example. In a standard device of this kind, the SBAS data usually comes from a geosynchronous satellite of the augmentation system coupled to the satellite positioning network CS. Consequently, the device comprises a receiver locked onto the sending frequency of the geosynchronous satellite (this is generally the frequency L1 of 1575 MHz, which is the same as that of the constellation CS). The receiver card CR of the device DPS of the invention can be configured to receive SBAS signals from the augmented system. However, this is not obligatory if all the SBAS data comes from the extraction module ME.

To be more precise, the device DPS of the invention comprises, firstly, a card CR dedicated to receiving navigation data transmitted by the constellation CS, secondly, a correction module MC1 for applying to the navigation data supplied by the card CR corrections that are a function of the SBAS data supplied by the extraction module ME, and, thirdly, a calculation module MC2 for determining the position of the mobile telephone UE from, in particular, corrected navigation data delivered by the correction module MC1 and the pseudo-distances delivered by the card CR and the extraction module ME, and for supplying positions to the processing module PM of the mobile telephone UE.

As previously indicated, in the embodiment of the invention shown, the mobile telephone UE is also capable of receiving complementary navigation data taking the form of second navigation messages and also coming from the hybrid network. This is why, in the present example, the extraction module ME has two outputs, one for supplying the correction module MC1 with data extracted from the first navigation messages (augmentation data, for example of the SBAS type), and the other for supplying the calculation module MC2 with navigation data and pseudo-distances extracted and/or deduced from the second navigation messages.

As the person skilled in the art knows, the card CR uses the signals that contain navigation data sent to the device DPS by the constellation CS first to determine the propagation time between the mobile telephone UE in which it is installed and the navigation satellites SN that sent the signals and then the to determine pseudo-distances (also known as "pseudoranges") from the propagation time. The calculation module MC2 determines the position of the mobile telephone UE from these pseudo-distances, by quadrilateration at least, and usually by effecting a numerical solution using the least squares method with four unknowns and at least four measurements.

The pseudo-distances and the associated navigation data sent by the extraction module ME are of substantially the same type as those determined by the card CR. However, the pseudo-distances transmitted by the extraction module ME come from terrestrial repeaters RT at fixed and constant positions, and do not require the same corrections as are applied by the correction module MC1 to the pseudo-distances determined by the card CR. This is why, in the example shown, the second output of the extraction module ME supplies the calculation module MC2 directly. The latter therefore determines the position of the mobile telephone UE from the pseudo-distances deduced from corrected data delivered by the correction module MC1 and uncorrected data delivered by the extraction module ME.

If the augmented frame includes first and second navigation messages, the two messages may constitute a single navigation message of the type shown in FIG. 1. This kind of message includes 450 bits, for example, divided into a first range P1 of 8 bits, forming a preamble for the data of the second message, a second range P2 of 206 bits, forming the data of the second message, a third range P3 of 6 bits, forming a message type identifier for the first message (here of the SBAS type), a fourth range P4 of 212 bits forming the SBAS data of the first message, and, finally, a fifth range P5 of 18 bits for parity checking.

Figure 4:
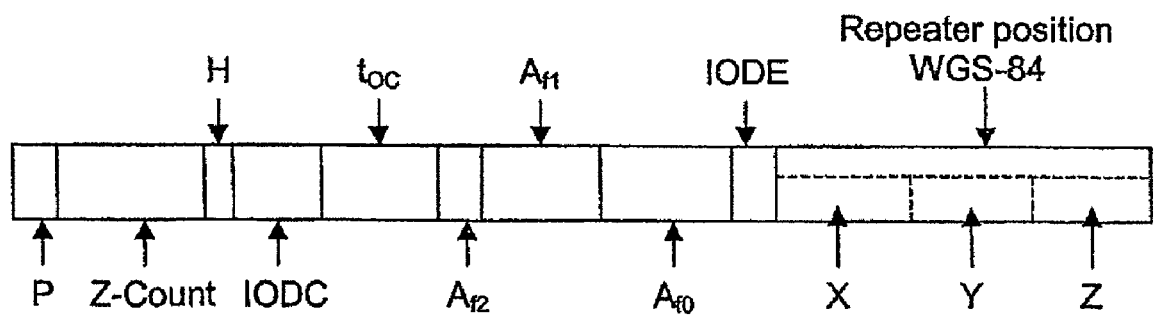
FIG. 4 is a diagram of a portion of the FIG. 3 navigation message.

The first range P1 and the second range P2 are preferably arranged like a GPS type message, as shown in FIG. 4. For example, this provides a first area P (equal to the range P1) of 8 bits chosen from 24 bits (and conforming to versions A, B, C and later versions and revisions of the DO229 standard), a second area Z-count of 29 bits (having the same definition as in a GPS message), a third area H of 1 bit for defining the status of the terrestrial repeater RT, a fourth area IODC (Issue Of Data Clock) of 10 bits for clock problems, a fifth area $t_{OC}$, a sixth area $A_{f2}$, a seventh area $A_{f1}$ and an eighth area $A_{f0}$, respectively of 16 bits, 8 bits, 16 bits and 22 bits, for defining the clock ephemerides of the terrestrial repeater that will enable the device DPS to determine the time shift of the terrestrial repeater relative to the reference time of the constellation CS of the positioning network (GPS), a ninth area IODE (Issue Of Data Ephemeris) of 8 bits for ephemerides problems, and a tenth area Repeater position WGS-84 of 96 bits (3×32 bits) for defining the geographical position (X, Y and Z) in an ECEF system of axes (typically WGS-84, or more generally the same system of axes as is used by the constellation CS).

The third range P3 and the fourth range P4 preferably constitute a copy of the first message (SBAS NOF) received from a sender station SE via the telecommunication satellite ST. This first message therefore preferably conforms to versions A, B, C and subsequent versions and revisions of the RTCA DO229 standard.

The arrangement of the navigation message described above is merely one illustrative and non-limiting example. Consequently the message could include more than or fewer than 450 bits. A variant may in particular be envisaged in which the IODE field of the ninth area is dispensed with, because the terrestrial repeater RT is at a fixed location on the ground. In particular this means that its eight bits may be assigned to parity checking. A variant may also be envisaged in which the number of bits in the IODC field of the fourth area is reduced to four. In particular this enables a further six bits to be assigned to parity checking.

Inserting the first message into the forwarded frame could be omitted. It is nevertheless preferable to insert it because the mobile telephones UE cannot always receive the augmented frames (containing the first messages) transmitted by the telecommunication satellite ST.

The mode of integration of the navigation messages into the augmented frames in the terrestrial repeaters RT depends on the transmission mode used.

For example, if the signals defining the frames are frequency-modulated by the OFDM technique, the (first and second) navigation messages are preferably inserted into the cyclic preamble PRC of the frame, which defines the temporal domain DT that is essential to frequency synchronization (and therefore to temporal correlation) of the signals in the mobile telephone UE. The cyclic preamble is preferably inserted into the frame after the (payload) communication data has been converted into the selected frequency domain DF.

Figure 5:
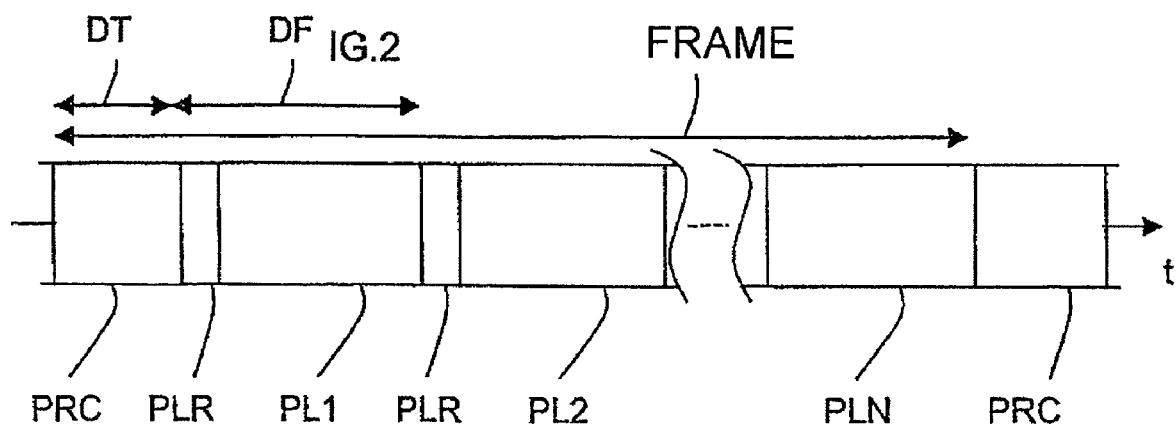
FIG. 5 is a diagram of the arrangement of a frame modulated by the OFDM technique.

FIG. 5 shows one example of an OFDM modulated frame. A frame of N symbols (representing communication data) comprises a cyclic preamble PRC followed by a reserve range PLR, by a range PL1 reserved for the payload portion of the first symbol, another reserve range PLR, a range PL2 reserved for the payload portion of the second symbol, and so on up to the Nth range PLN, which is reserved for the payload portion of the Nth symbol.

Alternatively, the signals defining the frames may be modulated and coded by the W-CDMA technique, which allows transmission of complementary navigation data substantially identical to that used by the navigation satellites SN of the constellation CS. Being well known to the person skilled in the art, like the preceding (OFDM) technique, this modulation technique is not described in detail. Suffice to say that the L-band (or other) carrier is spread spectrum (BPSK) modulated using a binary code resulting from the sum modulo 2 of a pseudo-random code (selected from a list of mutually orthogonal codes) and the complementary navigation data to be sent.

The demodulation may be effected in the hybrid receiver RH of the mobile telephone UE, in the same way as when it is effected by the demodulator of the card CR of a standard device DPS operating at the current frequency L1 or at any other frequency, for example the future frequency L5. To this end, the hybrid receiver RH therefore includes a demodulator that is either of the OFDM type or of the W-CDMA type, according to the type of modulation effected in the terrestrial repeaters RT of the hybrid network. However, in the case of W-CDMA type modulation, effecting the demodulation in the hybrid receiver RH may also be envisaged, for example (de-scrambling) and then in the extraction module ME (de-multiplexing).

It is important to note that the frequency band used by the telecommunication networks of the installation of the invention to transmit complementary navigation data covers all of the spectrum (L band, S band, etc.) with the exception of protected bands such as the L1 and L5 bands.

The integration module M1 of the terrestrial repeater RT may equally be adapted to integrate identification data enabling a mobile telephone UE to distinguish between the terrestrial repeaters RT around it into the augmented frames to be sent. This is necessary in particular if the terrestrial repeaters RT are geographically decorrelated (a mobile telephone UE can receive beacons only from the cell in which it is situated or from an adjoining cell if it is close to the border).

The identification data consists of the pseudo-random codes used for multiplexing, for example. Using a reserved family of these codes to effect padding may be envisaged, the number of padding codes depending on the local range of the terrestrial repeaters RT or on the number of terrestrial repeaters that a mobile telephone UE can see. For example, it may include four codes or seven codes. These pseudo-random codes are selected from the list of Gold Codes and are preferably different from the 36 codes used by the GPS network.

The invention also offers a method of determining positions of mobile communication terminals UE within a telecommunication installation comprising at least one telecommunication network with terrestrial repeaters and at least one satellite positioning system.

The latter may in particular be implemented using the telecommunication installation described above. The main and optional functions and sub-functions of the steps of that method being substantially identical to those of the means constituting the installation, only the steps implementing the main functions of the method of the invention are summarized hereinafter.

That method consists, firstly, in sending the mobile terminals UE signals containing navigation data using the positioning network CS, secondly, constituting augmented frames by integrating complementary navigation data at selected communication data frame locations and then sending the augmented frames to the mobile terminals UE, and, thirdly, determining in the mobile terminals UE their respective positions from navigation data received from the positioning network and complementary navigation data contained in the augmented frames received from the telecommunication network.

The invention is not limited to the embodiments of a telecommunication installation, a mobile telecommunication network, a terrestrial repeater, a stream server, a mobile communication terminal and a method described above by way of example only, but encompasses all variants that the person skilled in the art might envisage that fall within the scope of the following claims.

Thus an installation is described above in which first and second navigation messages are sent to the mobile communication terminals via the telecommunication network. However, sending said mobile terminals only first messages or only second messages via the telecommunication network could be envisaged.

Moreover, an installation is described above in which the telecommunication network is of the hybrid satellite type. However, the invention relates equally to telecommunication radio networks and in particular to cellular GSM/GPRS and UMTS networks.

Moreover, mobile terminals are described above including a satellite positioning device DPS separate from the communication receiver RH and the extraction module ME. However, having them constitute a single communication and positioning device may be envisaged, in particular if the band used for communications is compatible with that used for positioning. In this case, a single card could be dedicated to receiving navigation signals and communication frames.

The invention claimed is:

1. A mobile communication terminal (UE) for a telecommunication installation including at least one telecommunication network with terrestrial repeaters (RT) and at least one satellite positioning network (CS) that delivers signals containing navigation data, said mobile communication terminal (UE) comprising:
   reception and calculation means (DPS) that determine the terminal's position from said signals and navigation data;
   communication means (RH) that receive communication data frames from said telecommunication network as augmented frames including complementary navigation data and communication data; and
   extraction means (ME) that extract said complementary navigation data from said augmented frames received by said communication means (RH) and send them to said reception and calculation means (DPS) which determine said position from said navigation data and said complementary navigation data.

2. Terminal according to claim 1, characterized in that said extraction means (ME) extract from said received augmented frames complementary navigation data in the form of first navigation messages.

3. Terminal according to claim 2, characterized in that said first navigation messages are of the SBAS type.

4. Terminal according to claim 2, characterized in that said reception and calculation means (DPS) comprise correction means (MC1) coupled to said extraction means (ME) that determine from received first navigation messages corrections to be applied to navigation data received from said positioning network (CS) before proceeding to determine said positions.

5. Terminal according to claim 2, characterized in that said extraction means (ME) extract complementary navigation data in the form of first and second navigation messages from said received augmented frames.

6. Terminal according to claim 1, characterized in that said extraction means (ME) extract complementary navigation data in the form of second navigation messages from said received augmented frames.

7. Terminal according to claim 6, characterized in that said augmented frames including said second navigation messages come from said repeaters of said telecommunication network.

8. Terminal according to claim 7, characterized in that said communication means (RH) and said extraction means (ME) receive and process augmented frames including identification data for distinguishing said terrestrial repeaters (RT) from each other.

9. Terminal according to claim 7, characterized in that said reception and calculation means (DPS) comprise signal reception means (CR) and calculation means (MC1) that conjointly determine pseudo-distances from said signals received and navigation data that they contain, and in that said communication means (RH) and said extraction means (ME) conjointly determine pseudo-distances from said received augmented frames and navigation data contained in said second messages that they contain, these pseudo-distances and those determined by said reception means (CR) and said calculation means (MC1) being then sent to said reception and calculation means (DPS) for them to determine said positions.

10. Terminal according to claim 1, characterized in that said communication means (RH) and said extraction means (ME) receive and process augmented frames sent in the form of signals frequency-modulated by the OFDM technique.

11. Terminal according to claim 10, characterized in that at least said second navigation messages are integrated into a cyclic frame preamble after conversion of the frequency of the communication data.

12. Terminal according to claim 1, characterized in that said communication means (RH) and said extraction means (ME) receive and process augmented frames sent in the form of multiple access phase-modulated signals.

13. Terminal according to claim 12, characterized in that the multiple access phase modulation is effected by the W-CDMA technique.

14. Terminal according to claim 12, characterized in that said communication means (RH) and said extraction means (ME) receive and process augmented frames sent after encoding the first and/or second navigation messages using a selected sequence of orthogonal pseudo-random codes.

15. Terminal according to claim 14, characterized in that said communication means (RH) and said extraction means (ME) receive and process augmented frames including identification data for distinguishing said terrestrial repeaters (RT) from each other, and further characterized in that said identification data consists of the pseudo-random codes used in a sequence.

16. A terrestrial repeater (RT) for a telecommunication network of a telecommunication installation including at least one satellite positioning network (CS) that delivers signals containing navigation data, a mobile communication terminal (UE) including reception and calculation means (DPS) that determine the terminal's position from said signals and navigation data and communication means (RH) that receive communication data frames from said telecommunication network, said terrestrial repeater comprising:

integration means (MI) adapted to integrate complementary navigation data at selected locations in at least some of said communication data frames, to constitute augmented frames; and send/receive means (MER) adapted to transmit said augmented frames to said mobile terminals (UE).

17. Terrestrial repeater according to claim 16, characterized in that said send/receive means (MER) receive from said telecommunication network augmented frames including complementary navigation data in the form of first navigation messages and forward said received augmented frames to said communication terminals (UE).

18. Terrestrial repeater according to claim 17, characterized in that said first navigation messages are of the SBAS type.

19. Terrestrial repeater according to claim 17, characterized in that said integration means (MI) constitute augmented frames by integrating second navigation messages including complementary navigation data, and further characterized in that said integration means (MI) integrate second navigation messages into augmented frames received from said telecommunication network and containing first navigation messages.

20. Terrestrial repeater according to claim 16, characterized in that said integration means (MI) constitute augmented frames by integrating second navigation messages including complementary navigation data.

21. Terrestrial repeater according to claim 20, characterized in that said integration means (MI) constitute said augmented frames in the form of signals frequency-modulated by the OFDM technique.

22. Terrestrial repeater according to claim 21, characterized in that said integration means (MI) integrate at least said second navigation messages into a cyclic frame preamble after conversion of the frequency of the communication data to effect frequency synchronization with said extraction means (ME) of the mobile terminals (UE).

23. Terrestrial repeater according to claim 20, characterized in that said integration means (MI) send said augmented frames in the form of multiple access phase-modulated signals.

24. Terrestrial repeater according to claim 23, characterized in that the multiple access phase modulation is effected by the W-CDMA technique.

25. Terrestrial repeater according to claim 23, characterized in that said integration means (MI) effect their transmissions after encoding of the first and/or second navigation messages with the aid of a selected sequence of orthogonal pseudo-random codes.

26. Terrestrial repeater according to claim 25, characterized in that said integration means (MI) integrate identification data for distinguishing between them into said augmented frames, and further characterized in that said identification data consists of the pseudo-random codes used in a sequence.

27. Terrestrial repeater according to claim 20, characterized in that said integration means (MI) integrate identification data for distinguishing between them into said augmented frames.

28. A stream server (SF) for a telecommunication network having terrestrial repeaters (RT) as part of a telecommunication installation also including at least one satellite positioning network (CS) that delivers signals containing navigation data, a mobile communication terminal (UE) including reception and calculation means (DPS) that determine the terminal's position from said signals and navigation data and communication means (RH) that receive communication data frames from said telecommunication network, said stream server receiving communication data and complementary navigation data and constituting augmented communication data frames from said communication data and said complementary navigation data to be sent at least to said terrestrial repeaters (RT) and said mobile terminals (UE).

29. Server according to claim 28, characterized in that it constitutes augmented frames including complementary navigation data in the form of first navigation messages.

30. Server according to claim 29, characterized in that said first navigation messages are of the SBAS type.

31. Server according to claim 28, characterized in that it integrates the same first navigation message into a selected number of successive augmented frames.

32. Server according to claim 28, further comprising:
 a telecommunication network of a telecommunication installation including at least one satellite positioning network (CS) that delivers signals containing navigation data, said mobile communication terminal (UE) including reception and calculation means (DPS) that determine the terminal's position from said signals and navigation data, and communication means (RH) that receive communication data frames from said telecommunication network, said network including:
  at least one terrestrial repeater (RT) including integration means (MI) adapted to integrate complementary navigation data at selected locations in at least some of said communication data frames to constitute augmented frames, send/receive means (MER) adapted to transmit said augmented frames to said mobile terminals (UE), and
  at least one stream server (SF) receiving communication data and complementary navigation data and constituting from said communication data and said complementary navigation data augmented frames to be sent at least to said terrestrial repeater (RT) and said mobile terminal (UE).

33. Server according to claim 32, characterized in that the network is selected from a group comprising at least radio broadcast networks, hybrid satellite broadcast networks, wide-band multimedia data broadcast networks and terrestrial mobile telephone radio networks.

34. Server according to claim 32, further comprising:
 a telecommunication installation including:
  the telecommunication network with terrestrial repeaters (RT),
  at least one satellite positioning network (CS) that delivers signals containing navigation data, and
  at least one mobile communication terminal (UE) comprising reception and calculation means (DPS) that determine it's position from said signals and navigation data, and communication means (RH) that receive communication data frames from said telecommunication network, wherein said communication means receive from said telecommunication network augmented frames including complementary navigation data and communication data, said mobile communication terminal further including extraction means (ME) that extract complementary navigation data from augmented frames received by said communication means (RH) and send them to said reception and calculation means (DPS) for determining said position from said navigation data and said complementary navigation data.

35. A method of determining positions of mobile communication terminals (UE) within a telecommunication installation including at least one telecommunication network with terrestrial repeaters (RT) that sends communication data frames and at least one satellite positioning network (CS) that delivers signals containing navigation data, the method comprising:
 i) sending said mobile terminals (UE) signals containing navigation data with the aid of said positioning network (CS);
 ii) constituting augmented frames by integrating complementary navigation data at selected locations of communication data frames and then sending said augmented frames to said mobile terminals (UE); and
 iii) determining in said mobile terminals (UE) said mobile terminals' respective positions from said navigation data received from said positioning network (CS) and said complementary navigation data contained in said augmented frames received from said telecommunication network.

36. Method according to claim 35, characterized in that some of said complementary navigation data comes from said positioning network (CS) and is integrated into said augmented frames, upstream of said terrestrial repeaters (RT), in the form of first navigation messages.

37. Method according to claim 36, characterized in that said first navigation messages are of the SBAS type.

38. Method according to claim 36, characterized in that the integration of the same first navigation message into successive augmented frames is repeated a selected number of times.

39. Method according to claim 36, characterized in that some of said complementary navigation data is integrated into said augmented frames in said terrestrial repeaters (RT) in the form of second navigation messages, and further characterized in that some of said complementary navigation data is integrated in the form of second navigation messages in said terrestrial repeaters (RT) into received augmented frames containing first navigation messages.

40. Method according to claim 36, characterized in that corrections to be applied to the navigation data received from said positioning network (CS) are determined in said mobile terminals (UE) from the first navigation messages received, before proceeding to determine said positions.

41. Method according to claim 35, characterized in that some of said complementary navigation data is integrated into said augmented frames in said terrestrial repeaters (RT) in the form of second navigation messages.

42. Method according to claim 41, characterized in that said augmented frames are sent by said terrestrial repeaters (RT) in the form of signals frequency-modulated by the OFDM technique.

43. Method according to claim 42, characterized in that at least said second navigation messages are integrated into a cyclic frame preamble after conversion of the frequency of the communication data to effect frequency synchronization in said mobile terminals (UE).

44. Method according to claim 41, characterized in that said augmented frames are sent by said terrestrial repeaters (RT) in the form of multiple access phase-modulated signals.

45. Method according to claim 44, characterized in that the multiple access phase modulation is effected by the W-CDMA technique.

46. Method according to claim 44, characterized in that said augmented frames are transmitted after encoding of the first and/or second navigation messages with the aid of a selected sequence of orthogonal pseudo-random codes.

47. Method according to claim 46, characterized in that identification data for distinguishing them from each other is integrated into said augmented frames in said terrestrial repeaters (RT), and further characterized in that said identification data consists of the pseudo-random codes used in a sequence.

48. Method according to claim 41, characterized in that identification data for distinguishing them from each other is integrated into said augmented frames in said terrestrial repeaters (RT).

49. Method according to claim 41, characterized in that pseudo-distances are determined in said mobile terminals (UE) firstly from said signals received and navigation data that they contain and secondly from augmented frames received and navigation data contained in said second messages that they contain, these pseudo-distances then being used to determine said positions.

* * * * *

UNITED STATES PATENT AND TRADEMARK OFFICE
CERTIFICATE OF CORRECTION

PATENT NO. : 7,580,381 B2 Page 1 of 1
APPLICATION NO. : 10/547788
DATED : August 25, 2009
INVENTOR(S) : Michelon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 981 days.

Signed and Sealed this

Fourteenth Day of September, 2010

David J. Kappos
*Director of the United States Patent and Trademark Office*